United States Patent
Kiest, Jr.

(10) Patent No.: US 8,739,809 B2
(45) Date of Patent: *Jun. 3, 2014

(54) DEVICE AND METHOD FOR REPAIRING PIPE

(71) Applicant: LMK Technologies, LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/624,527

(22) Filed: Sep. 21, 2012

(65) Prior Publication Data

US 2013/0019983 A1      Jan. 24, 2013

Related U.S. Application Data

(63) Continuation of application No. 12/251,505, filed on Oct. 15, 2008, now Pat. No. 8,375,972.

(60) Provisional application No. 60/999,034, filed on Oct. 15, 2007.

(51) Int. Cl.
*F16L 55/16* (2006.01)

(52) U.S. Cl.
USPC ............ 137/15.09; 137/315.01; 138/97; 138/98; 405/184.2

(58) Field of Classification Search
USPC ............ 137/15.08, 15.09, 317, 318, 315.01; 138/98, 97; 405/184.1, 184.2
See application file for complete search history.

(56) References Cited

U.S. PATENT DOCUMENTS

| | | | |
|---|---|---|---|
| 5,727,597 A | 3/1998 | Fisco | |
| 5,950,682 A | 9/1999 | Kiest, Jr. | |
| 5,964,249 A | 10/1999 | Kiest, Jr. | |
| 6,484,757 B1 | 11/2002 | Warren | |
| 6,641,687 B2 | 11/2003 | Kiest et al. | |
| 7,311,121 B2 | 12/2007 | Kamiyama et al. | |
| 7,987,873 B2 | 8/2011 | Kiest, Jr. | |
| 8,375,972 B2 * | 2/2013 | Kiest, Jr. | 137/15.09 |
| 2005/0121092 A1 | 6/2005 | Kiest, Jr. | |
| 2006/0137816 A1 | 6/2006 | Taylor et al. | |
| 2008/0029177 A1 | 2/2008 | Kamiyama et al. | |

FOREIGN PATENT DOCUMENTS

WO      WO 98/55796 A1      12/1998

OTHER PUBLICATIONS

Search Report for co-pending PCT/US2008/079918 listing relevent art the International Searching Authority.

* cited by examiner

*Primary Examiner* — Kevin Lee
(74) *Attorney, Agent, or Firm* — McKee, Voorhees & Sease

(57) ABSTRACT

The present invention includes a device and method for reinforcing the portions of an inflation bladder not contained by a liner in pipeline renewal applications. A liner/bladder assembly is provided wherein the liner is positioned relative to the bladder such that a portion of the bladder having a greater wall thickness extends beyond the ends of the liner. The present invention also includes a device and method for repairing the junction of a main pipe and the lateral pipe with bladders reinforced in areas unconstrained by the liners.

35 Claims, 6 Drawing Sheets

DEVICE AND METHOD FOR REPAIRING PIPE

CROSS-REFERENCE TO RELATED APPLICATIONS

This application is a Continuation Application of U.S. Ser. No. 12/251,505 filed Oct. 15, 2008, now U.S. Pat. No. 8,375,972, which claims priority under 35 U.S.C. §119 of a provisional application Ser. No. 60/999,034 filed Oct. 15, 2007, which application is hereby incorporated by reference in its entirety.

BACKGROUND OF THE INVENTION

The present invention relates to a device and a method for repairing pipe, such as underground sewer pipe and the like.

Prior methods for repairing damage to pipelines include moving a liner tube impregnated with a liquid material capable of curing and hardening to a position within the pipe where the damaged portion is located. An inflation bladder is often used to urge the liner tube in an outward radial direction into contact with the pipe being repaired and a liquid material impregnating the liner tube is permitted to cure and harden. The liner tube is installed by pulling, pushing or everting the liner into the host pipe. Once the liner is positioned within the host pipe, it is pressurized, usually by an inflation bladder, causing the liner to press against the interior wall of the host pipe, and the liner is cured by applying heat, such as steam or hot water. These liners can also be cured at ambient temperatures by a chemical mixture which generates an exothermic reaction. The liner tube forms an interior liner in the pipe for the pipeline being repaired. Such a process is known as cured-in-place pipelining.

On some occasions lateral pipes are connected to main pipes. Often damage occurs at the junction between the lateral pipe and the main pipe, which is regarded as one of the weakest points in a sewer system. T-shaped or Y-shaped liner tubes have been utilized to fit within the junction between the lateral and main pipes. Liner tubes form a T-shaped or Y-shaped liner after hardening to the interior of the junction between the pipes. Again, inflation bladders are typically used to pressurize the liners against the interior walls of the host pipes.

To ensure that the liner is open ended, the inflation bladder normally extends some distance beyond the liner tube. For example, the bladder tube may extend a foot beyond the liner tube. Pressures may range between approximately 5 and 30 PSI within the inflation bladder during an evertion process where the liner transitions from inside the bladder to outside the bladder.

The portion of the inflation bladder that is not contained by the liner or host pipe creates a weak point in the system. Where the bladder is contained by the liner or host pipe, it can withstand more pressure before bursting or failing. The weak points in the system where the bladder is not contained by the liner effectively limit how much pressure you can put in the inflation bladder before the bladder will burst, which is known as the burst pressure or failure point. Also, the closed end of the bladder and points where the bladder is connected to a launching device are weak points where the bladder is prone to burst.

FIGS. 1 and 2 illustrate a prior art device and method of lining the junction between a main pipe 10 and a lateral pipe 12. The liner/bladder assembly shown includes a lateral liner tube 14, a main liner tube 16, a lateral bladder tube 18, and a main bladder tube 20. The liner/bladder assembly is positioned about a launching device 22. Once the launching device 22 is in an operable position in the main pipe 10 adjacent the opening to the lateral pipe 12, the lateral bladder tube 18 and lateral liner tube 14 are everted into the lateral pipe 12 and the main bladder tube 20 is inflated to press the main liner tube 16 against the main pipe 10. The main and lateral bladder tubes 20, 18 are pressurized using a fluid, such as air, steam or hot water.

As shown in FIG. 2, portions A of the lateral bladder tube 18 and portions B of the main bladder tube 20 refer to weak points in the system where the bladder tubes are not contained by the main and lateral liner tubes 16, 14. These unrestrained locations of the bladder tubes limit how much pressure can be applied within the bladder tubes.

There is therefore a need in the art for a device and method of renewing a pipeline that eliminates or reduces the number of weak points in the system when the inflation bladders are pressurized. There is also a need in the art for a device and method that allows greater pressure to be applied within the inflation bladder without bursting the bladder.

BRIEF SUMMARY OF THE INVENTION

It is therefore a principal object, aspect, feature or advantage of the present invention to provide an apparatus and method for repairing a pipeline which improves over or solves the problems and deficiencies in the art.

Further objects, features, aspects and/or advantages of the invention relate to an apparatus and method which eliminates or reduces the number of weak points in inflation bladders used in pipe renewal.

Another object, feature, aspect and/or advantage of the present invention includes a device and method for repairing a pipeline that allows greater pressures to be applied within the inflation bladder without bursting the bladder.

These and other objects, features, aspects and advantages of the present invention will become more apparent with reference to the accompanying specification and claims.

The present invention may be used in all types of pipelining, such as lining an entire main sewer pipe from manhole to manhole, lining a section of sewer pipe, lining the entire length of a lateral pipe, lining a potable water main, lining a gas pipeline, lining a lateral pipe and the connection to a main pipe, and similar structures.

One aspect of the invention includes a liner/bladder assembly having an elongated tubular inflation bladder with a peripheral wall of different thicknesses. A first longitudinal portion of the wall has a first wall thickness and a second longitudinal portion has a second wall thickness greater than the first wall thickness. An elongated tubular liner is journaled within the inflation bladder so that the portion of the inflation bladder having a greater wall thickness extends beyond the end of the liner.

Another aspect of the invention includes a method of forming a liner/bladder assembly for repairing the interior wall of a pipe. The method includes taking an elongated tubular liner and an elongated tubular inflation bladder and inserting the liner into the bladder. The wall of the bladder is folded onto itself to form a longitudinal portion having a greater wall thickness. The liner is positioned within the bladder so that the longitudinal portion of a liner having a greater wall thickness extends beyond the end of the liner. The liner/bladder assembly can then be everted so that the liner is on the outside of the bladder and pressed against an internal wall of the pipe. Reinforced areas of the bladder that are not contained by the liner allow greater pressure to be applied within the bladder without bursting the bladder.

Another aspect of the invention includes an apparatus for repairing the junction of a main pipe and a lateral pipe. The apparatus generally comprises a main bladder tube, a containment tube surrounding the main bladder tube, a lateral bladder tube, a main liner member, a lateral liner tube, and a launcher device. The main bladder tube and the containment tube are outside of and surrounding the launcher device and the main liner member is outside of at least partially surrounding the containment tube, the main bladder tube, and the launcher device. Both the main bladder tube and the containment tube extend beyond the ends of the main liner member and are connected to the launching device. The containment tube functions to reinforce the portions of the main bladder tube that extend beyond the main liner member. In a preferred form, the portion of the lateral liner tube extending beyond the lateral liner is also reinforced.

Yet another aspect of the present invention includes a liner/bladder assembly as described above for lining a lateral pipe and the junction between a main pipe and the lateral pipe.

Another aspect of the present invention includes a method for repairing a damaged pipe junction using the liner/bladder assembly wherein the assembly is moved through the main pipe to an operative position with the main liner member adjacent the pipe junction. The lateral lining tube is inserted into the lateral pipe. The lateral lining tube is pressed against an interior wall of the lateral pipe and the lateral liner member is pressed against the interior wall of the main pipe.

DETAILED DESCRIPTION OF THE EXEMPLARY EMBODIMENTS

Figure 1:
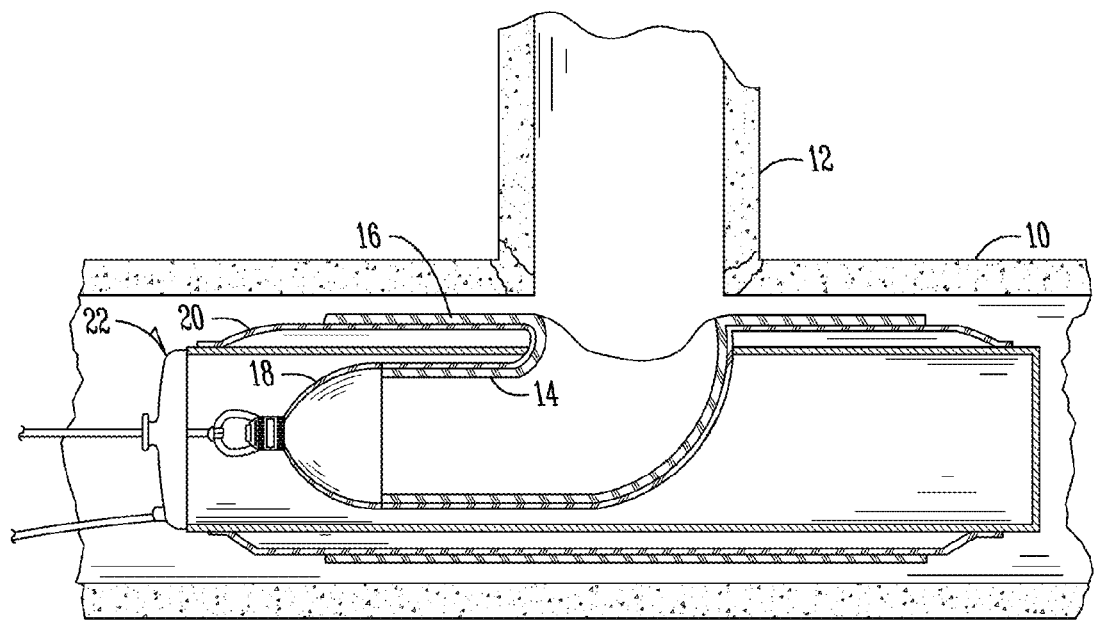
FIG. 1 is a sectional view of a main pipe and a lateral pipe, showing a prior art lining apparatus.

For a better understanding of the invention, several examples of forms of the invention will now be described in detail. Frequent reference will be made to the accompanying figures. Reference numerals will be used to indicate certain parts or locations in the figures. The same reference numerals will be used to indicate the same or similar parts or locations throughout the figures unless otherwise indicated.

In cured-in-place lining applications, it is common to use a liner/bladder assembly wherein the liner is initially journaled within the bladder in an inverted position. When the bladder is pressurized, the liner and bladder are everted with the liner tube pressed against the interior of the host pipe and the bladder tube on the inside of the liner tube. One end of the bladder tube is cinched or closed. Typically, a rope is attached to the closed end which can be used to retract the bladder from the pipe once the liner has cured and hardened to the interior wall of the host pipe.

Figure 3:
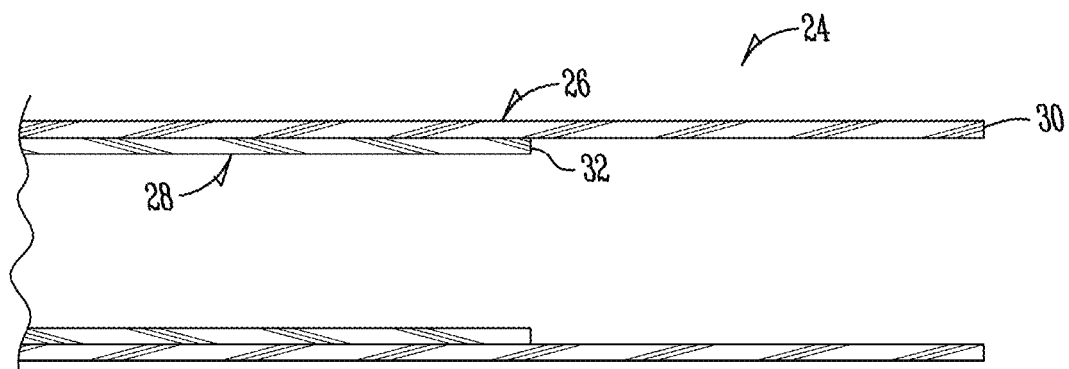
FIG. 3 is a partial sectional view of a liner/bladder assembly of the present invention with the liner in an inverted position prior to closing the end of the bladder.

FIG. 3 shows a liner/bladder assembly 24 with a bladder tube 26 and a liner tube 28 prior to closing one end 30 of the bladder tube 26. The bladder tube 26 is of sufficient length to extend beyond the end of the liner tube 32 when fully everted into the host pipe. In sewer pipe applications, approximately one foot of additional bladder tube 26 extending past the liner tube 32 has been found acceptable in most applications. This allows sufficient bladder material to extend beyond the end of the liner tube 28 when the liner tube 28 and bladder tube 26 are everted into the host pipe. It also provides sufficient bladder material to cinch or close the end of the bladder tube 26.

Figure 4:
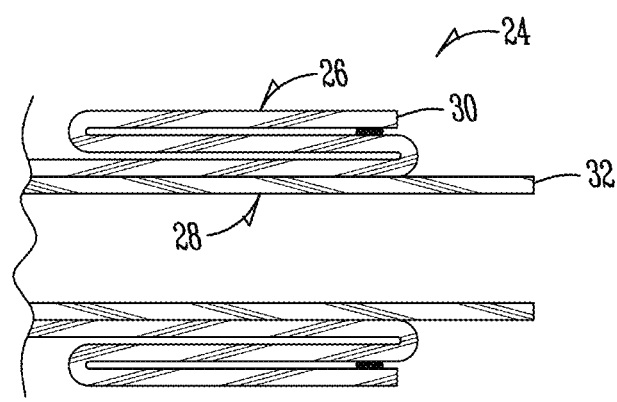
FIG. 4 is a sectional view similar to FIG. 3, showing one end of the bladder folded to create a greater wall thickness near the end of the liner tube.

One embodiment of the present invention increases the length of the bladder tube extending beyond the end of the liner tube 28. The additional length of bladder tube 26 is used to create a reinforced portion of the bladder tube 26 not contained or restrained by the liner tube 28. For lateral sewer pipe rehabilitation, approximately three foot of bladder tube 26 extending beyond the liner tube 28 has been found acceptable. As shown in FIG. 4, the end 30 of the bladder tube 26 extending beyond the end 32 of the liner tube 28 is folded back onto itself. The bladder tube 26 is folded back on itself in a "Z" or "S" shape and an adhesive or other connecting means connects the end 30 of the bladder tube 26 to a point on the bladder tube 26 even with or backwards from the end 32 of the liner tube 28. In an application where three feet of bladder tube 26 extends beyond the end 32 of the liner tube 28, the end 30 of the bladder tube 26 is adhered to an interior wall portion approximately 48 inches backwards from the end 32 of the liner tube 28. Thus, when the bladder tube 26 is unfolded and laid flat (see FIG. 5), there is approximately one foot of reinforced bladder preceding the end 32 of the liner tube 28 and one foot of reinforced bladder extending beyond the end 32 of the liner tube 28. The reinforced bladder is formed from doubling the wall thickness of the bladder tube 26.

The end of the bladder tube 26 can be adhered to an interior wall portion using a variety of adhesives or connecting means. The solvent tetrahydrofuran (THF) has been found suitable for use with the present invention. Applying a small amount of the solvent dissolves a portion of the plastic and effectively bonds the two surfaces together around the entire periphery of the wall of the bladder. Such a solvent can also be applied easily in the field.

Figure 5:
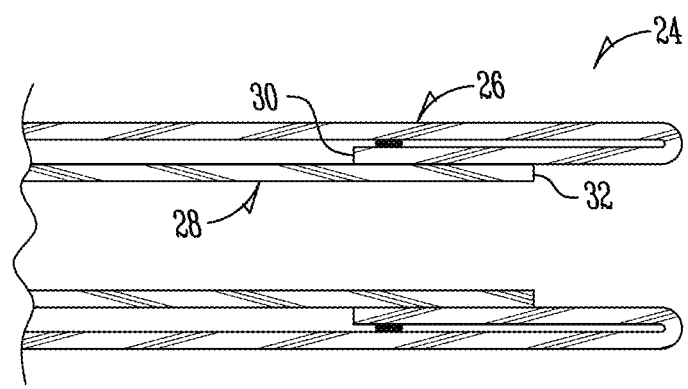
FIG. 5 is a sectional view similar to FIG. 4, showing the bladder with the reinforced wall portion in a lay flat position.

FIG. 5 shows the liner/bladder assembly with the reinforced end of the bladder tube 26 unfolded in a lay flat position. When the bladder tube 26 is unfolded and laid flat, there is approximately one foot of reinforced bladder backwards of the liner tube 28 and one foot of reinforced bladder extending beyond the liner tube 28. It is preferred that when the end 30 of the bladder tube 26 is folded back on itself, the overlapping portion of the bladder tube 26 will be in contact with the liner tube 28.

FIGS. 6A-E illustrate the process of preparing the end of the liner/bladder assembly 24, including the steps of folding the bladder tube 26 back on to itself and adhering the end 30 of the bladder tube 26 to an interior wall portion of the bladder tube 26. Those skilled in the art will appreciate that the dimensions provided are specific to an application for lining four and six-inch diameter lateral sewer pipe. The photographs and descriptions contained therein are exemplary only.

Figure 6A:
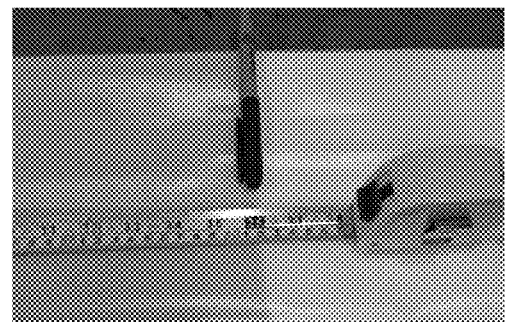
FIGS. 6A-E are photographs, illustrating an exemplary method of preparing an end portion of the liner/bladder assembly.
Figure 6B:
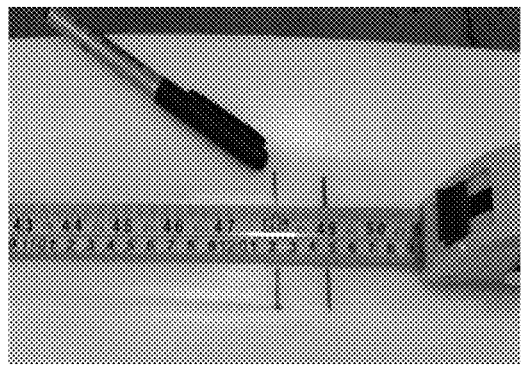
Figure 6C:
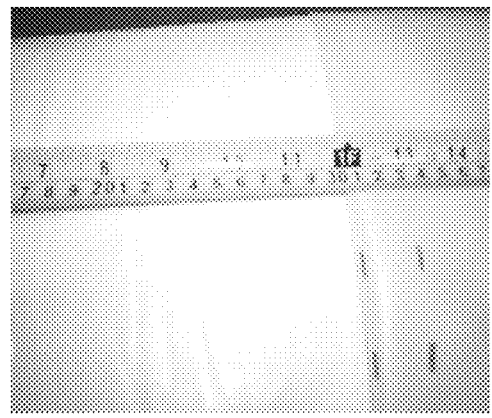

As shown in FIG. 6A, the liner tube 28 should preferably be positioned within the bladder tube 26 approximately three-feet from the end of the bladder tube 26. As shown in FIG. 6B, two marks are made on the bladder tube 26, preferably at 48 and 49 inches from the end of the bladder tube 26. The end of the bladder tube 26 is then folded back over itself until both the 48 inch and 49 inch marks are visible with the fold occurring at the 49 inch mark, which is now 12 inches from the end of the liner tube 28. This is illustrated in FIG. 6C.

Figure 6D:
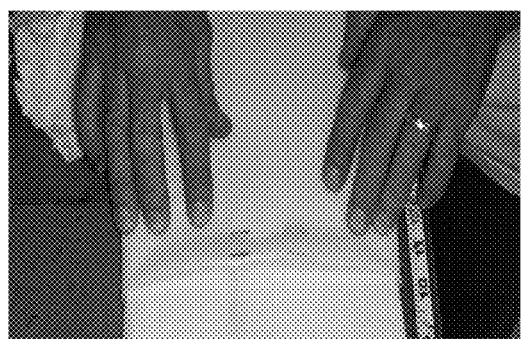
Figure 6E:
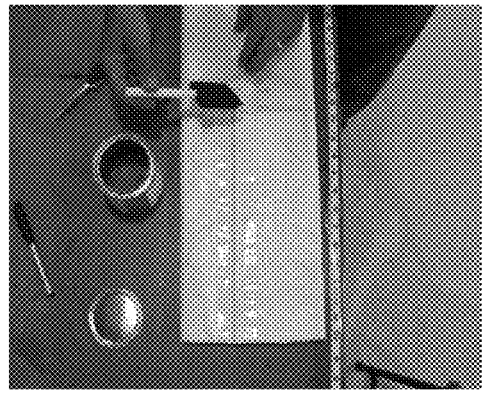

Next, the bladder tube 26 is folded back over itself again, as shown in FIG. 6D, creating a three-layer "Z" bladder configuration. The end of the bladder tube 26 is aligned with the 48 inch mark, which is the mark closest to the hands depicted in the photograph in FIG. 6D. An adhesive or other connecting means (preferably THF) is applied in a one inch-two-inch-wide single pass to the end of the bladder tube 26 when aligned at the 48 inch mark, as shown in FIG. 6E.

Once the reinforced longitudinal portion of the bladder tube 26 has been formed, then the end of the bladder tube 26 can be closed. This is illustrated in the photographs contained in FIGS. 7A-F. The surplus of bladder tube 26 extending beyond the liner tube 28 is fan-folded. A grommet is put into the end of the bladder tube 26. Next, a rope is used to make approximately one double hitch and three or four half hitch knots around the fan-folded portion of the bladder tube 26. The leading end of the rope is then put through the grommet. Finally, the end of the bladder is taped, using black electrical tape or duct tape.

Figure 7A:
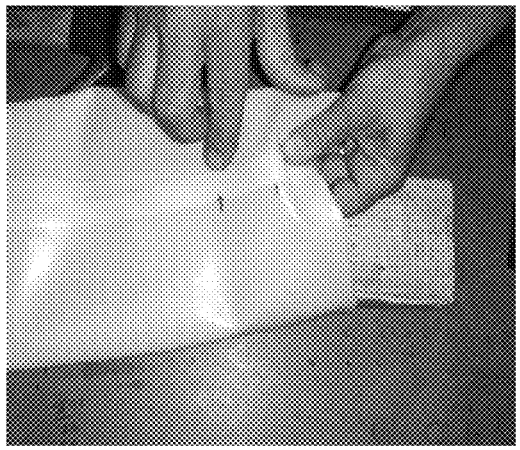
FIGS. 7A-F are photographs, illustrating an exemplary method of how the bladder tube in the liner/bladder assembly is closed.
Figure 7B:
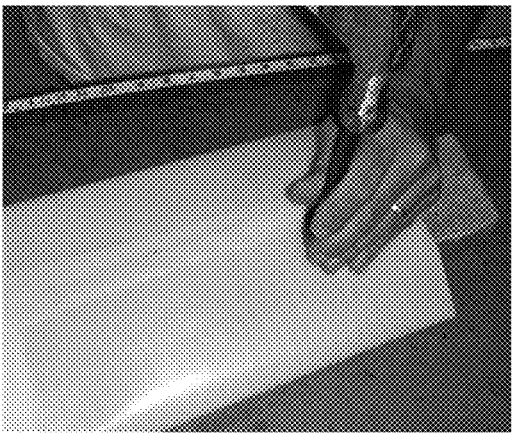
Figure 7C:
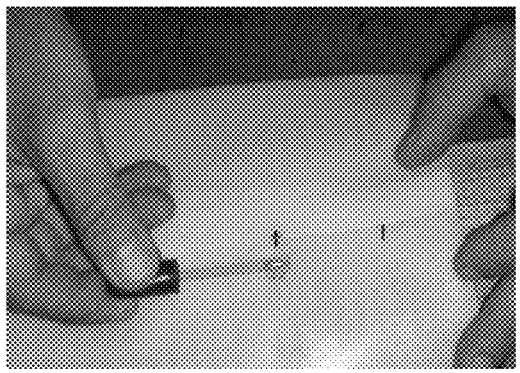
Figure 7D:
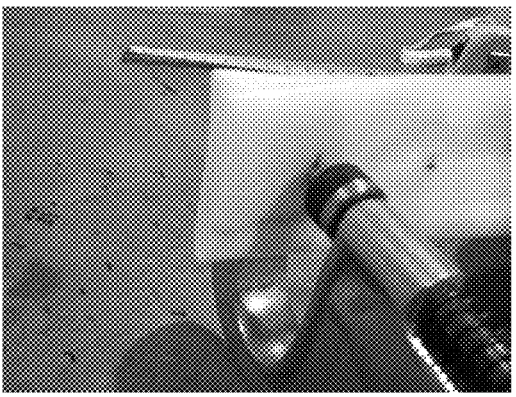
Figure 7E:
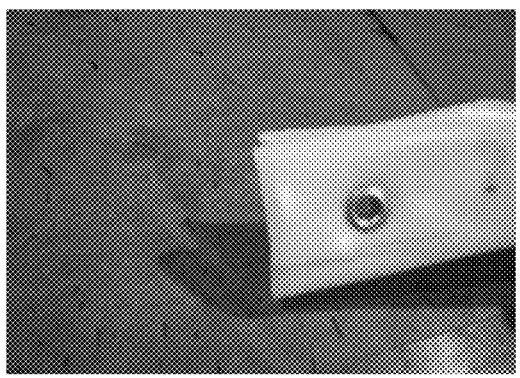
Figure 7F:
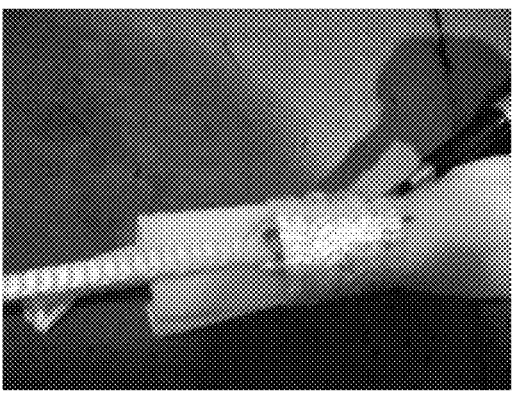

The specific steps described above are illustrated in FIGS. 7A-F. Again, those skilled in the art will appreciate that the dimensions provided are specific to an application for aligning four and six-inch diameter lateral sewer pipe. The photos and descriptions contained are exemplary only. As shown in FIG. 7A, a one-inch mark is made at the end of the double-layered end of the bladder tube 26. The end of the bladder tube 26 is fan folded with the layers measuring approximately two-inches wide. A three-inch grommet is inserted through all layers at the one-inch mark, as illustrated in FIG. 7D. A one-inch flat rope is prepared to be placed around the bladder. The bladder is tied by one double hitch and three-four half hitch knots, and the rope is fed through the grommet with tape applied, as illustrated in FIG. 7F.

Note that an exhaust port may be necessary if steam is used to cure the resin impregnated liners. The exhaust port should be made prior to fan-folding the end 30 of the bladder tube 26. As shown in FIG. 7B, this is done by putting a board underneath one of the double layers of bladder tube 26 and punching a hole through the one doubled layer. It is important that the holes stay aligned with each other to prevent one layer of the reinforced bladder portion from blocking the other layer. This can be done by applying an adhesive, such as the solvent previously disclosed, around the inside of the holes (see FIG. 7C), or punching another grommet in the bladder tube 26.

Figure 8:
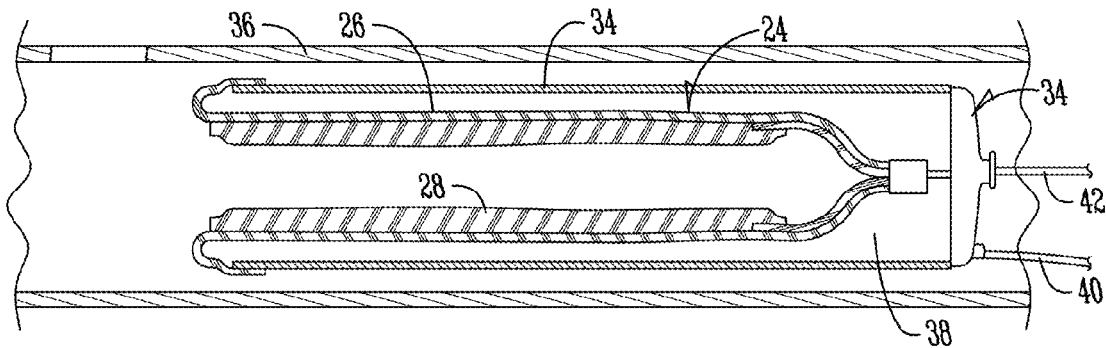
FIG. 8 is a sectional view of the liner/bladder assembly of FIGS. 3-5 mounted to a launcher device with the liner/bladder assembly in an inverted position within the launcher device.

FIG. 8 shows the liner/bladder assembly 24 in a launching device 34 prior to everting the assembly into the host pipe 36. Air pressure is introduced into the cavity 38 of the launcher device 34 through an air hose 40, urging the liner bladder assembly 24 to evert out of the launching device 34. Although air is the preferred pressurized material, other gases or fluids may be used.

Figure 9:
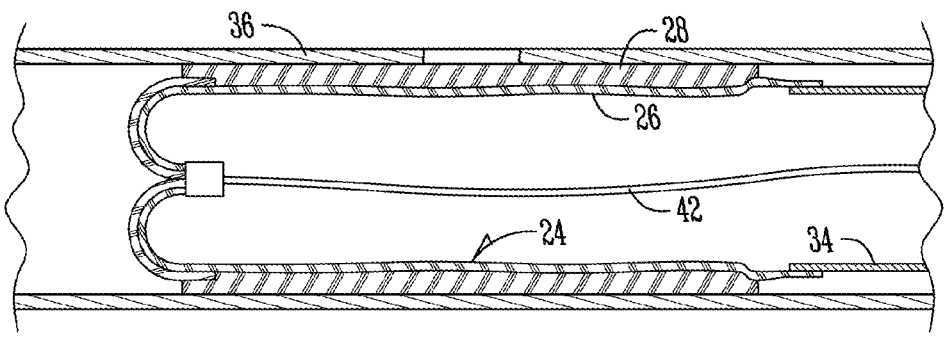
FIG. 9 is a sectional view similar to FIG. 8, showing the liner/bladder assembly in an everted position to line the interior wall of a host pipe.

FIG. 9 illustrates the liner/bladder assembly 24 in the everted position. This evertion process causes the lateral liner tube 28 to be positioned on the outside of the bladder tube 26 and against the interior wall of the host pipe 36. Note that the portions of the bladder tube 26 on either side of the end of the liner tube 28 have a double layer of thickness. It is most important that the portion of bladder tube 26 extending beyond the liner tube 28 be reinforced. However, it has been found useful to also reinforce the area of the bladder tube 26 approximately one foot preceding the end 32 of the liner tube 28 in case the bladder tube 26 stretches lengthwise.

Pressure with the cavity 38 is maintained, and the lateral liner tube 28 impregnated with a resinous material cures and hardens, forming a lining to the host pipe 36. The bladder tube 26 is then depressurized and removed using rope 42. The bladder tube 26 is preferably made from a translucent polyurethane material with a reinforced scrim. Such a bladder tube having a thickness of approximately 20 mils has been found suitable for use with the present invention.

Figure 2:
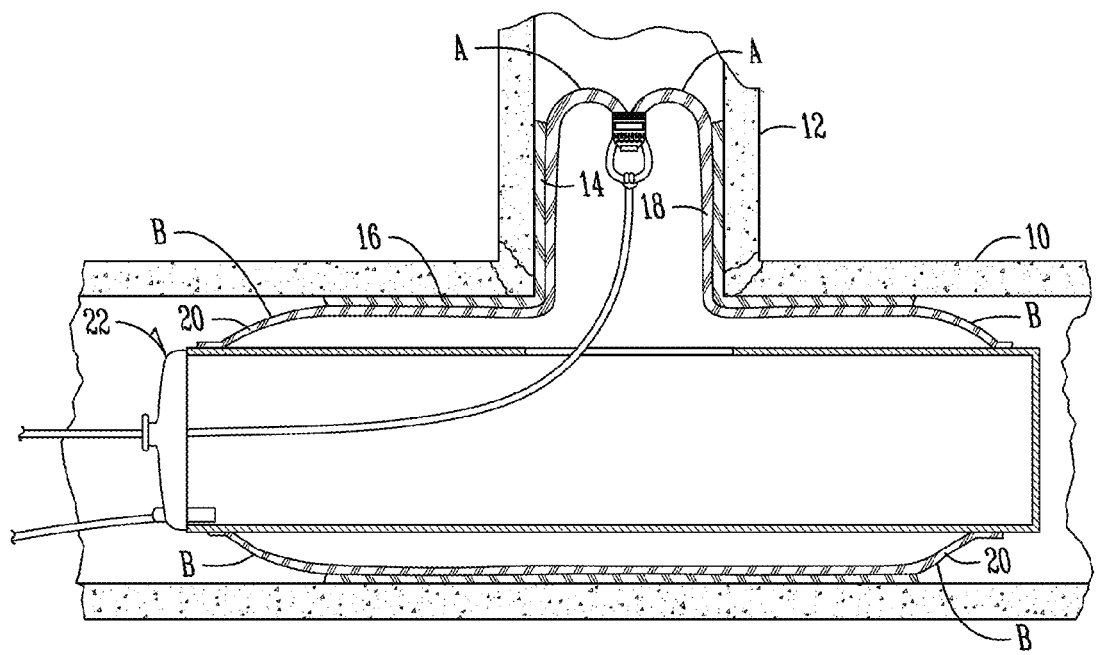
FIG. 2 is a sectional view similar to FIG. 1, showing a lateral liner everted into the lateral pipe.

Another aspect of the invention relates to a new device and method for repairing the junction between a main pipe and a lateral pipe. As discussed in the Background of the Invention with reference to the prior art FIGS. 1 and 2, the unconstrained portions of a main bladder tube and lateral bladder tube are problematic. This aspect of the invention provides a way to contain the areas of the bladders that extend beyond the liners to prevent the bladders from bursting when pressurized.

Figure 10:
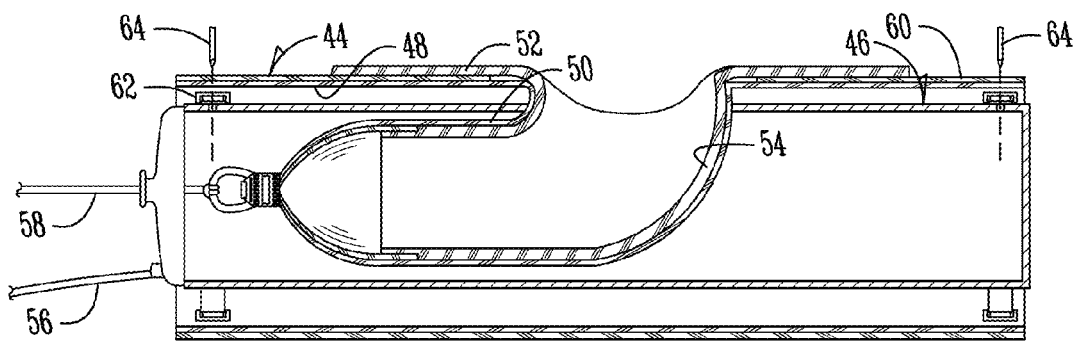
FIG. 10 is a sectional view of an alternative embodiment of the present invention for use in lining the junction between a lateral pipe and a main pipe.

FIG. 10 is a sectional view of a liner/bladder assembly 44 on a launching device 46. The liner/bladder assembly 44 includes a main bladder tube 48, a lateral bladder tube 50, a main liner tube 52, and a lateral liner tube 54. The main liner tube 52 is preferably formed from a flat sheet of liner material and is wrapped to form a tube. However, a main liner member that forms less than a full circle, which is used in so-called "top-hat" applications, can also be used with the present invention.

The lateral liner tube 54 and lateral bladder tube 50 shown in FIG. 10 are short enough in length such that they can be contained within the launcher device 46. This is exemplary only, as the present invention can be used to line a long length of lateral pipe. If necessary, the lateral liner tube 54 and lateral bladder tube 50 can extend beyond the end of the launcher device 46 with a collapsible hose fitted to the end of the launcher device 46 to extend the cavity that when pressurized urges the lateral liner tube 54 and lateral bladder tube 50 to evert out of the launcher device 46 and into the lateral pipe. Air is introduced into to the cavity through an air hose 56. A rope 58 extends from one end of the lateral bladder tube 50. Applying a force to the rope 58 helps to control how quickly the lateral liner tube 54 and lateral bladder tube 50 are everted into the lateral pipe. Pulling on the rope 58 also removes the lateral bladder tube 50 once the lateral liner tube 54 has cured and hardened to the interior wall of the lateral pipe.

The liner/bladder assembly 44 is mounted about the launcher device 46 as illustrated and described in FIGS. 7 and 8 of U.S. Pat. No. 6,039,079, the entirety of which is incorporated into this disclosure by reference, or as is commonly known in the art. The lateral liner tube 54 and lateral bladder tube 50 are pulled into the launcher opening of the launcher device 46 while keeping the main bladder tube 48 on the outside of the launcher device 46. A containment tube 60 or sleeve is then slid over the launcher device 46. The containment tube 60 preferably has a large hole or aperture to accommodate searching for and pulling the sheet for forming the main liner tube 52 out of the hole in the launcher device 46 so that it can be wrapped around the outside of the containment tube 60. At this point, the containment tube 60 is disposed between the main liner tube 52 and the main bladder tube 48.

It is preferred that the main bladder tube 48 and the containment tube 60 be manufactured with one or more holes around the periphery of the tubes near the ends. For example, holes can be located at the 10, 2 and 6 o'clock positions near both ends of the main bladder tube 48 and the containment tube 60.

The skids 62 on either end of the launcher device 46 act as a fixture tool with holes around the periphery that accept temporary pins 64. The holes in the main bladder tube 48 and the containment tube 60 are aligned with the holes in the skid 62 and the temporary pins 64 are inserted through the bladder tube 48 and the containment tube 60 and into the holes in the skid 62. This helps to ensure that the bladder tube 48 and the containment tube 60 are properly aligned and not twisted about the launcher tube 46, which can result in wrinkling the main liner.

Figure 11:
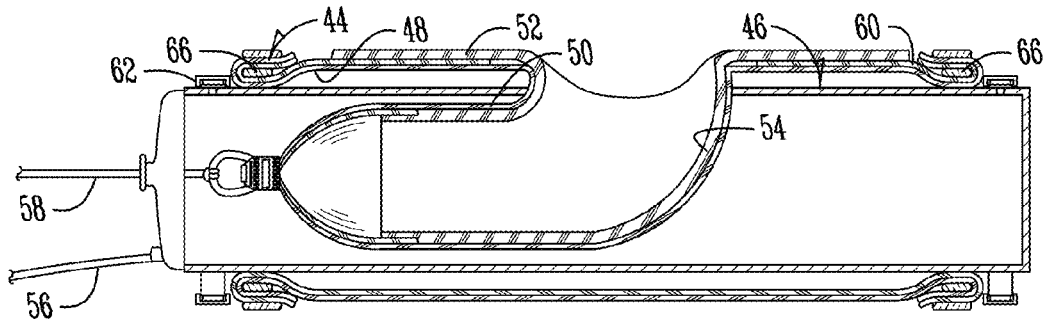
FIG. 11 is a sectional view similar to FIG. 10.

Once the main bladder tube 48 and the containment tube 60 are properly aligned with one another, stainless steel bands 66 are placed around the main bladder tube 48 and the containment tube 60 to keep the bladders from being pulled along the launcher tube 46 and to make an air tight connection (see FIG. 11). The surplus of the main bladder tube 48 and the containment tube 60 beyond the skid 62 is folded back over the band 66 and the ends are secured by tape or other attachment means.

Figure 12:
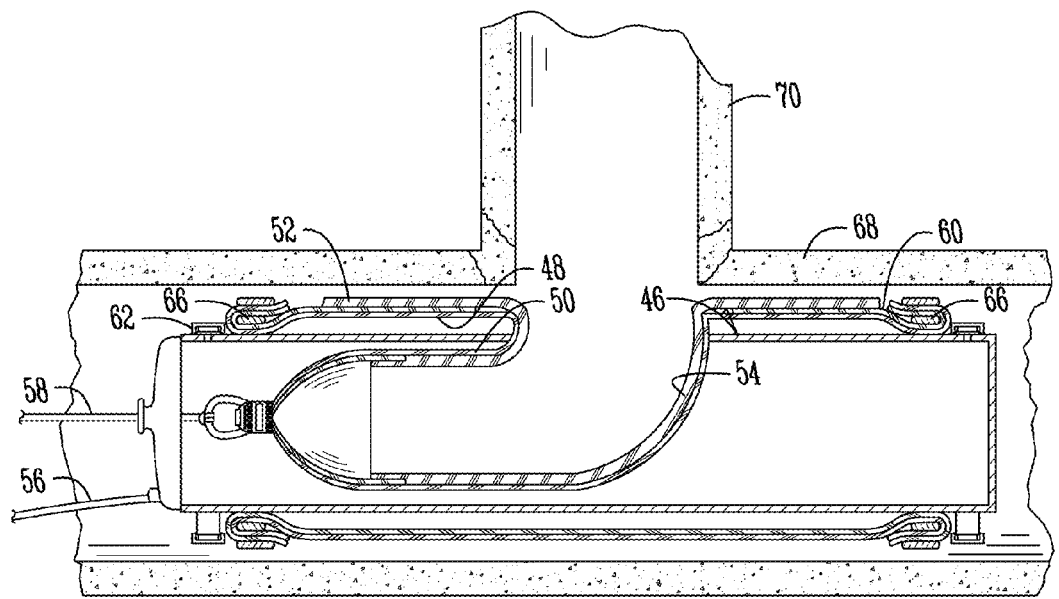
FIG. 12 is a sectional view of the alternative embodiment of FIGS. 10 and 11 near the junction between a main pipe and a lateral pipe.

FIG. 12 shows the liner/bladder assembly as mounted to a launcher device 46 that has been moved along a main sewer pipe 68 adjacent the opening to a lateral sewer pipe 70. This can be done using a robotic device (not shown). Once the opening of the launcher device 46 is aligned with the opening to the lateral pipe 70, the cavity in launcher device 46 can be pressurized, forcing the lateral liner tube 54 and the lateral bladder tube 50 to evert into the lateral pipe 70. The main bladder tube 48 is also inflated such that the main bladder tube 48 and the containment tube 60 apply a pressure to the main liner tube 52, pressing it against the interior wall of the main sewer pipe 68. Those skilled in the art will appreciate that the containment tube 60 helps restrain the main bladder tube 48. The containment tube 60 is a relatively inexpensive means to reinforce the bladder and more than double the strength of the bladder and increases the burst pressure or failure point of the bladder, especially where it is banded to the launcher device 46.

Again, the preferred pressurized material is air, but other gases or fluids may be used. Pressure within the cavity is maintained until the lateral liner tube 54 and the main liner tube 52 cure and harden. Those skilled in the art will appreciate that although it is preferred to use a main bladder tube 48 and a lateral bladder tube 50 that are fluidly connected, separate bladders can also be used. The containment tube 60 or sleeve is particularly useful in embodiments where the bladders are fluidly connected. Here, the main bladder tube 48 must be able to withstand pressures required to evert the lateral liner tube 54 into the lateral pipe 70. The containment tube 60 helps prevent the main bladder tube 48 from bursting or failing.

Figure 13:
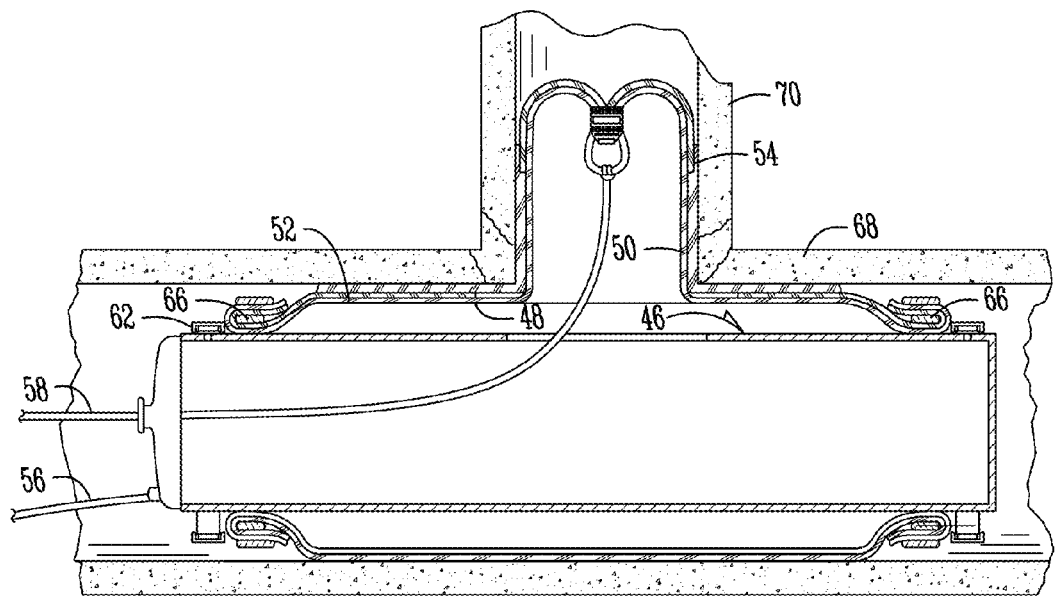
FIG. 13 is a sectional view similar to FIG. 12, showing the lateral lining tube and lateral bladder tube in an everted position within the lateral pipe.

The containment tube 60 is preferably formed of the same material as the main bladder tube 48, which is a translucent polyurethane material with reinforced scrim. Both the main bladder tube 48 and the containment tube 60 having a thickness of approximately 20 mils has been found suitable for use with the present invention. As shown in FIGS. 12 and 13, the lateral bladder tube 50 can also have a reinforced end as previously described.

The invention has been shown and described above with reference to the preferred or exemplary embodiments, and it is understood that many modifications, substitutions, and additions may be made which are within the intended spirit and scope of the invention but limited by the claims.

What is claimed is:

1. A bladder assembly for lining an interior wall of a pipe, comprising:
    an elongated tubular inflation bladder having a peripheral wall that terminates in a closed end, the wall of the inflation bladder having a first longitudinal portion with a first wall thickness and a second longitudinal portion at the closed end with a second wall thickness greater than the first wall thickness.

2. The bladder assembly of claim 1, wherein the greater wall thickness of the second longitudinal portion of the bladder being formed by at least two overlapping layers of the wall of the inflation bladder.

3. The bladder assembly of claim 2, wherein the inflation bladder is translucent.

4. A method of forming a bladder assembly for repairing an interior wall of a pipe, comprising:
    taking an elongated tubular inflation bladder having a peripheral wall extending between a first end and an opposite second end;
    folding the wall of the bladder onto itself near the first end of the bladder to form a longitudinal portion of the bladder having a greater wall thickness;
    connecting the first end of the bladder to the wall of the bladder between the first and second ends of the bladder; and
    closing the bladder.

5. The method of forming a bladder assembly of claim 4, wherein the first end of the bladder is connected to the wall of the bladder using a solvent.

6. The method of claim 5, wherein the solvent is Tetrahydrofuran (THF).

7. The method of claim 4, wherein the inflation bladder is translucent.

8. The method of claim 4, further comprising the step of making an aperture in the longitudinal portion of the bladder having a greater wall thickness to create an exhaust port.

9. A method of repairing an interior wall of a pipe, comprising:
    providing a liner having a first end and an opposite second end;
    providing a bladder assembly including an elongated tubular bladder having a peripheral wall that terminates in a closed end, the wall of the bladder having a first longitudinal portion with a first wall thickness and a second longitudinal portion at the closed end with a second wall thickness greater than the first wall thickness;
    impregnating the liner with a resinous material capable of curing and hardening; and
    pressing the liner against the interior wall of the pipe with the second longitudinal portion of the bladder extending beyond the first end of the liner.

10. The method of claim 9, wherein the second longitudinal portion of the bladder extends within the liner and beyond the first end of the liner when the liner is pressed against the interior wall of the pipe.

11. The method of claim 9, wherein the liner is journaled within the bladder so that the second longitudinal portion of the bladder extends beyond the first end of the liner.

12. The method of claim 11, further comprising:
everting the liner/bladder assembly so that the liner is on the outside of the bladder.

13. The method of claim 9, wherein the liner is formed from a resin absorbent material.

14. The method of claim 9, wherein the bladder is translucent.

15. The method of claim 9, wherein the liner is formed from a non-resin absorbent material.

16. An apparatus for repairing the junction of a main pipe and a lateral pipe connected thereto, comprising:
a main bladder tube;
a containment tube at least partially surrounding the main bladder tube;
a launcher device having a first end and an opposite second end and a launcher device opening there between;
the main bladder tube and the containment tube being outside and surrounding the launcher device; and
a main liner member being outside and contacting the containment tube.

17. The apparatus of claim 16, further comprising:
a lateral bladder tube, wherein the lateral bladder tube extends through the launcher device opening and into the inside of the launcher device.

18. The apparatus of claim 17, further comprising a lateral liner tube extending from the main liner member about a main liner member opening.

19. The apparatus of claim 16, wherein the main bladder tube and the containment tube both extend beyond a first end and a second end of the main liner member.

20. The apparatus of claim 16, wherein the main bladder tube comprises a translucent polyurethane material with a reinforced scrim.

21. The apparatus of claim 16, wherein the containment tube comprises a translucent material.

22. The apparatus of claim 21, wherein the containment tube comprises a polyurethane material.

23. The apparatus of claim 16, wherein the main liner member is in the form of a tube and at least partially surrounding the containment tube, the main bladder tube, and the launcher device.

24. The apparatus of claim 16, wherein the main bladder tube and the containment tube are connected to the launcher device by a band.

25. A method of repairing a damaged pipe junction between a main pipe and a lateral pipe, the method comprising:
providing an apparatus including a main bladder tube; a containment tube at least partially surrounding the main bladder tube; a launcher device having a first end and an opposite second end and a launcher device opening there between; the main bladder tube and the containment tube being outside and surrounding the launcher device; and a main liner member being outside and at least partially surrounding the containment tube, the main bladder tube, and the launcher device;
impregnating the main liner member with a resinous material capable of curing and hardening;
moving the apparatus through the main pipe to an operative position with the main liner member adjacent the pipe junction; and
pressing the main liner member against an interior wall of the main pipe.

26. The method of claim 25, further comprising:
providing a lateral bladder tube, wherein the lateral bladder tube extends through the launcher device opening and into the inside of the launcher device and a lateral liner tube extending from the main liner member about a main liner member opening;
impregnating the lateral liner tube with a resinous material capable of curing and hardening;
inserting the lateral lining tube into the lateral pipe; and
pressing the lateral lining tube against an interior wall of the lateral pipe.

27. The method of claim 26, wherein the lateral liner tube is everted into the lateral pipe.

28. The method of claim 27, wherein the main liner member and the lateral liner tube are impregnated with a resinous material before being positioned about the launching device.

29. A liner/bladder assembly for lining a lateral pipe and the junction between a main pipe and the lateral pipe, comprising:
a main bladder tube having first and second ends and a main bladder tube opening there between;
a lateral bladder tube extending from the main bladder tube about the main bladder tube opening;
a lateral liner tube journaled within the lateral bladder tube;
a containment tube at least partially surrounding the main bladder tube;
a main liner member having a first end and a second end and a main liner member opening there between;
the main liner member surrounding at least a portion of both the main bladder tube and the containment tube with the main bladder tube.

30. The liner/bladder assembly of claim 29, wherein the lateral bladder tube is in fluid communication with the main bladder tube.

31. The liner/bladder assembly of claim 29, wherein the lateral liner tube is operable from an inverted position within the lateral bladder tube to an everted position outside the lateral bladder tube.

32. The liner/bladder assembly of claim 29, wherein the containment tube extends beyond the first and second ends of the main liner member.

33. The liner/bladder assembly of claim 29, wherein the main liner is member is formed from a resin absorbent material.

34. The liner/bladder assembly of claim 29, wherein the main liner member is formed from a material that is not resin absorbent.

35. The liner/bladder assembly of claim 29, wherein the main bladder tube is translucent.

* * * * *